Nov. 30, 1943.                F. L. DARLING                2,335,839
                        HYDRAULIC BRAKE MECHANISM
                           Filed May 5, 1941
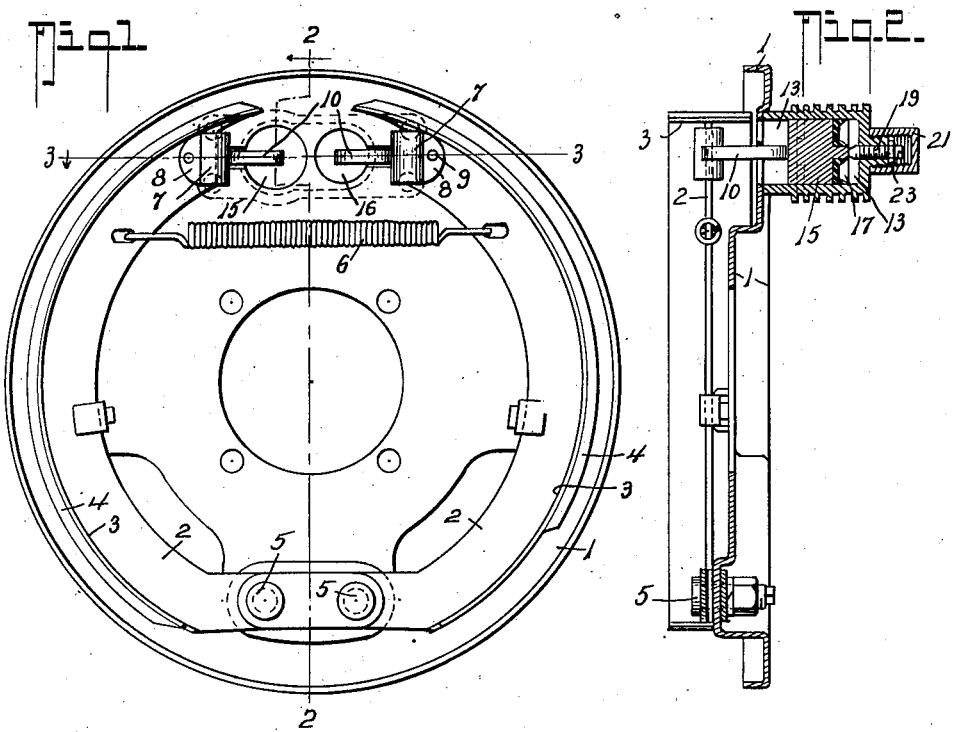
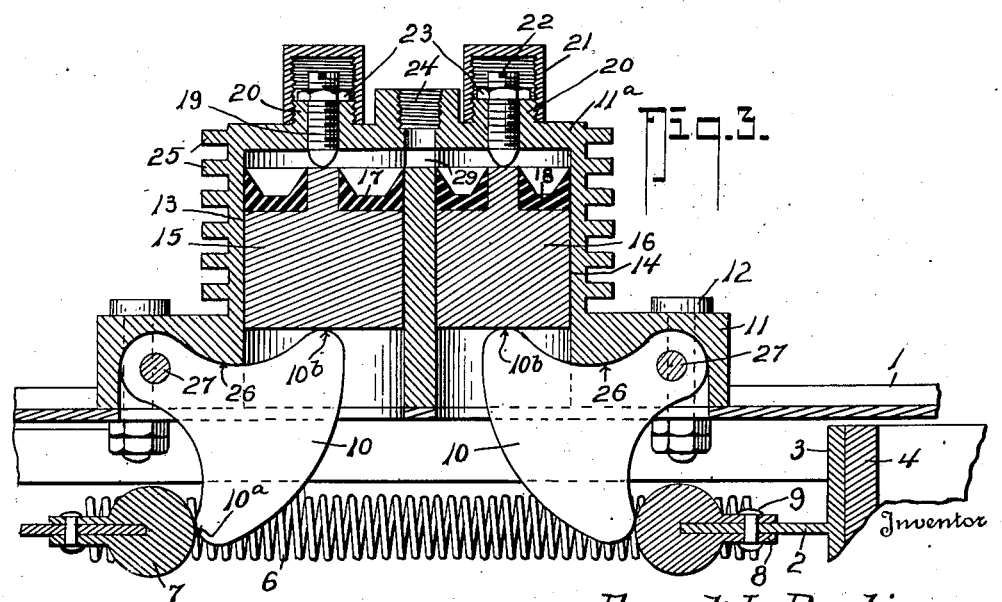
Inventor
Frank L. Darling
By Albert E. Dieterich
                                            Attorney Patented Nov. 30, 1943

2,335,839

UNITED STATES PATENT OFFICE 2,335,839

HYDRAULIC BRAKE MECHANISM

Frank L. Darling, Hollywood, Calif.

Application May 5, 1941, Serial No. 391,987

7 Claims. (Cl. 188—152)

My invention relates to certain new and useful improvements in hydraulic brakes, particularly those used on motor vehicles.

Such brakes now in common use employ a cylinder and pistons located inside the brake drum or housing for spreading the brake shoes into active contact with the drum. The action of the brake generates heat and when the brake is used for a considerable interval of time the fluid in the brake shoe cylinder becomes gasified. Consequently, the brake fails properly to operate.

When one brake of a two or four wheel system becomes overheated and the oil in its cylinder gasifies, operation failure of the brakes occurs. If the defective brake be on a front wheel, it may throw the steering mechanism out of balance with consequent danger to occupants of the vehicle.

Further, it is an object of this invention to provide a brake mechanism of the character stated in which friction between the brake shoe pistons and the shoes is reduced to a minimum.

Again, it is an object of the invention to provide a brake mechanism in which the brake cylinder is located in such position outside the drum as to be adequately air cooled, thereby preventing vaporization of the hydraulic fluid in the cylinder.

A further object is to provide easily accessible means to adjust the brake shoes.

Other objects will in part be obvious and in part be pointed out hereinafter.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawing, in which—

Fig. 1 is a face view of a left wheel brake mechanism unit.

Fig. 2 is a vertical section on line 2—2 of Fig. 1.

Fig. 3 is an enlarged horizontal section on line 3—3 of Fig. 1.

In the drawing, in which like numbers of reference indicate like parts in all the figures, 1 represents the mounting disc which carries the brake shoes, hydraulic cylinder, etc.

Each brake shoe may be of the usual construction, and comprises an annular flange 3, and a web flange 2 at right angles to the flange 3.

The shoes have the usual liner bands 4 secured to the flanges 3. Each shoe, at one end, is pivoted to a stud bolt 5 and at its other end carries a contact roller-like button 7 whose split ear 8 is riveted to the web flange 2 as at 9, or otherwise suitably secured thereto, preferably in a permanent manner.

The free ends of the brake shoes are connected together by a coil spring 6 which constantly tends to release the brake shoes from contact with the brake drum (not shown).

A brake cylinder 11ª is mounted, by bolts 12 passing through flanges 11, on the outer face of the disc 1 and comprises two piston chambers 13 and 14 in which the pistons 15 and 16, respectively, operate. In accordance with accepted practice the piston 15, which operates the forward shoe, is slightly larger in diameter than the piston 16, which operates the other shoe.

The motions of the pistons 15 and 16 are communicated to the shoes by means of rockers 10. These rockers are pivoted at 27 to the flanges 11 and have convex contact portions 10ª—10ᵇ to contact, respectively, the buttons 7 and the pistons with rolling contacts.

The cylinder block is shaped as at 26 to constitute a stop for the rockers to limit their movement in a direction to prevent the pistons from being forced in so far that their packings 17 and 18 may become injured should the adjusting screws 19 be removed.

The screws 19 are threaded into the cylinder bosses 20 and are secured by lock nuts 23, kerfs 22 being provided in the outer ends of the screws 19 for a screw driver. Caps 21 thread onto the bosses 20 over the screws 19 and protect the same, as well as aiding in preventing oil leakage.

The cylinder has a tapped entrance 24 for the hydraulic pipe line connection, and it also has a cross port 29 to effect constant communication between the entrance 24 and the respective chambers 13 and 14.

Suitable cooling fins 25, disposed in line with the draft set up by the moving vehicle, serve adequately to cool the cylinder block and thereby prevent vaporization of the fluid in the chambers 13 and 14.

It is to be noted that a single cylinder block houses both operating pistons in a compact manner so as to occupy but a small space near the top of the mounting disc, where the parts are easily accessible for adjustment of the brake shoes.

It will be further observed that by the arrangement of the contacts of the rockers with respect to the center lines of the pistons and webs 2, as shown in my invention, only a very slight (about .03 inch) contact movement is encountered under the ordinary adjustment of the brakes as the movement inward of the pistons, in practice, is only from about one-quarter (¼) inch to one-half (½) inch.

By arranging the cylinder outside the drum, with the axes of the pistons normal to the disc 1 and locating the rockers 10 in the plane containing the said axes, longer shoes can be used to give more braking surface if desired, as the free ends of the shoes can overhang the rockers (see Fig. 1).

From the foregoing description, taken in connection with the accompanying drawing, it is thought the construction, operation and advantages of the invention will be clear to those skilled in the art.

What I claim is:

1. In a hydraulic brake, a supporting disc, a pair of brake shoes each pivoted at one end to one face of said disc, the free ends of said shoes lying adjacent one another but spaced apart, means continuously tending to draw said free ends together, said disc having slots adjacent said free ends, a hydraulic brake shoe actuating unit mounted on the other face of said disc and comprising a cylinder having two piston chambers, free pistons in said chambers, rockers mounted on said cylinder and having portions contacting said pistons and having other portions projecting through said disc slots and cooperating with the free ends of said shoes to spread the same, and means to admit hydraulic fluid under pressure into said piston chambers.

2. In a hydraulic brake, a supporting disc, a pair of brake shoes each pivoted at one end to one face of said disc, the free ends of said shoes lying adjacent one another but spaced apart, means continuously tending to draw said free ends together, said disc having slots adjacent said free ends, a hydraulic brake shoe actuating unit mounted on the other face of said disc and comprising a cylinder having two piston chambers, free pistons in said chambers, rockers mounted on said cylinder and having portions contacting said pistons and having other portions projecting through said disc slots and cooperating with the free ends of said shoes to spread the same, means to admit hydraulic fluid under pressure into said piston chambers, and means mounted on the cylinder for adjusting the positions of said pistons and consequently adjusting the brake shoes.

3. In a hydraulic brake, a supporting disc, a pair of brake shoes each pivoted at one end to one face of said disc, the free ends of said shoes lying adjacent one another but spaced apart, means continuously tending to draw said free ends together, said disc having slots adjacent said free ends, a hydraulic brake shoe actuating unit mounted on the other face of said disc and comprising a cylinder having two piston chambers, free pistons in said chambers, rockers mounted on said cylinder and having portions contacting said pistons and having other portions projecting through said disc slots and cooperating with the free ends of said shoes to spread the same, means to admit hydraulic fluid under pressure into said piston chambers, and means for cooling said cylinders.

4. In a hydraulic brake, a supporting disc, a pair of brake shoes each pivoted at one end to one face of said disc, the free ends of said shoes lying adjacent one another but spaced apart, means continuously tending to draw said free ends together, said disc having slots adjacent said free ends, a hydraulic brake shoe actuating unit mounted on the other face of said disc and comprising a cylinder having two piston chambers, free pistons in said chambers, rockers mounted on said cylinder and having portions contacting said pistons and having other portions projecting through said disc slots and cooperating with the free ends of said shoes to spread the same, means to admit hydraulic fluid under pressure into said piston chambers, means mounted on the cylinder for adjusting the positions of said pistons and consequently adjusting the brake shoes, and means for cooling said cylinder.

5. In a hydraulic brake, a supporting disc, a pair of brake shoes each pivoted at one end to one face of said disc, the free ends of said shoes lying adjacent one another but spaced apart, means continuously tending to draw said free ends together, said disc having slots adjacent said free ends, a hydraulic brake shoe actuating unit mounted on the otoher face of said disc and comprising a cylinder having two piston chambers, free pistons in said chambers, rockers mounted on said cylinder and having portions contacting said pistons and having other portions projecting through said disc slots and cooperating with the free ends of said shoes to spread the same, and means to admit hydraulic fluid under pressure into said piston chambers, said shoes adjacent their free ends having buttons against which the rockers operate.

6. In a hydraulic brake, a supporting disc, a pair of brake shoes mounted on one side of said disc and having adjacent free ends, means continuously tending to move said ends toward each other, and means mounted on the other side of said disc and cooperatively engaging said free ends to spread the shoes to apply the brakes, said shoe spreading means including a free hydraulically operated piston for each shoe, cylinders in which said pistons operate, means to admit hydraulic fluid to said cylinders to act on said pistons for effecting a spreading of the shoes, and floating members effecting cooperative connection between the respective pistons and their brake shoes.

7. In a hydraulic brake, a supporting disc, a pair of brake shoes mounted on one side of said disc and having adjacent free ends, means continuously tending to move said ends toward each other, and means mounted on the other side of said disc and cooperatively engaging said free ends to spread the shoes to apply the brakes, said shoe spreading means comprising hydraulic cylinders, the axes of which lie normal to the plane in which the shoes lie, a free piston in each cylinder, floating members, one for each piston-shoe combination for transmitting motion of the pistons in one direction to the respective shoes, means to admit hydraulic fluid to the ends of the cylinders which are most remote from said disc, by virtue of all of which the forces, acting through the pistons and the floating members, on the brake shoes act with minimum friction and the hydraulic fluid is prevented from vaporizing due to generation of heat.

FRANK L. DARLING.